3,001,538
ERROR DETECTOR FOR PNEUMATIC TRANSMISSION SYSTEM

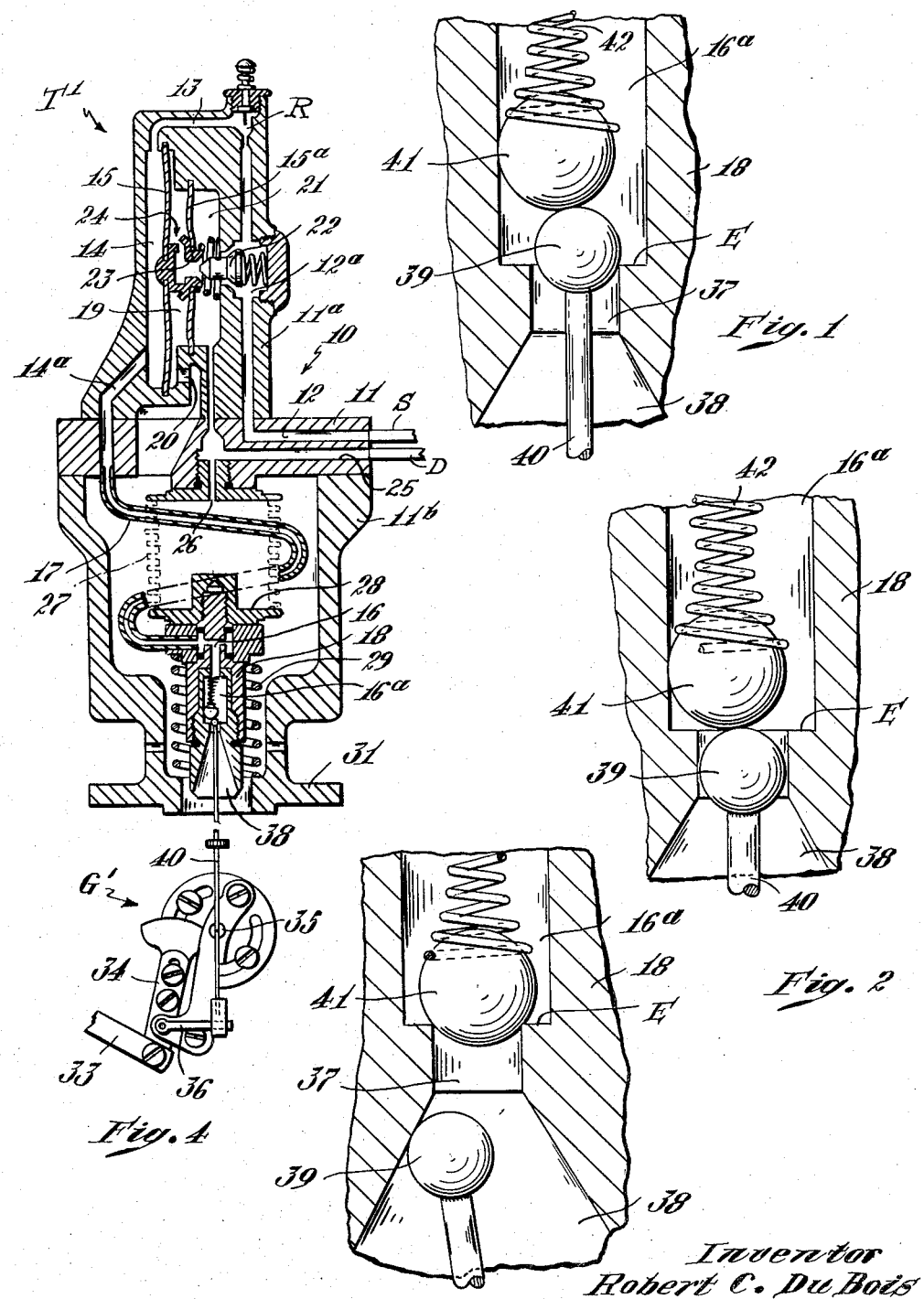

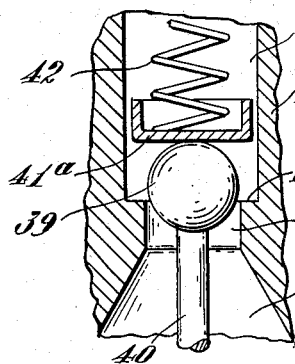
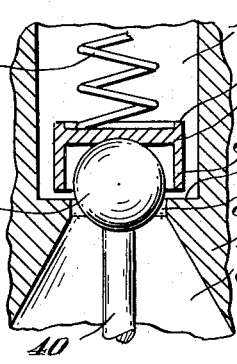
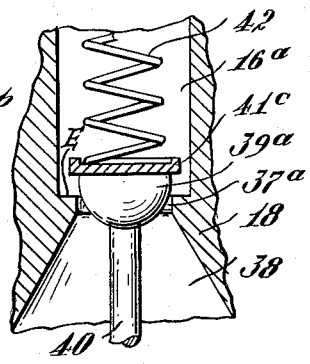
Fig. 5  Fig. 6  Fig. 7
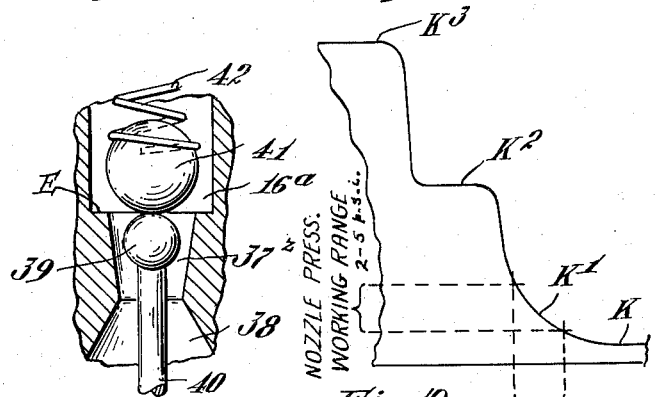
Fig. 8  Fig. 10
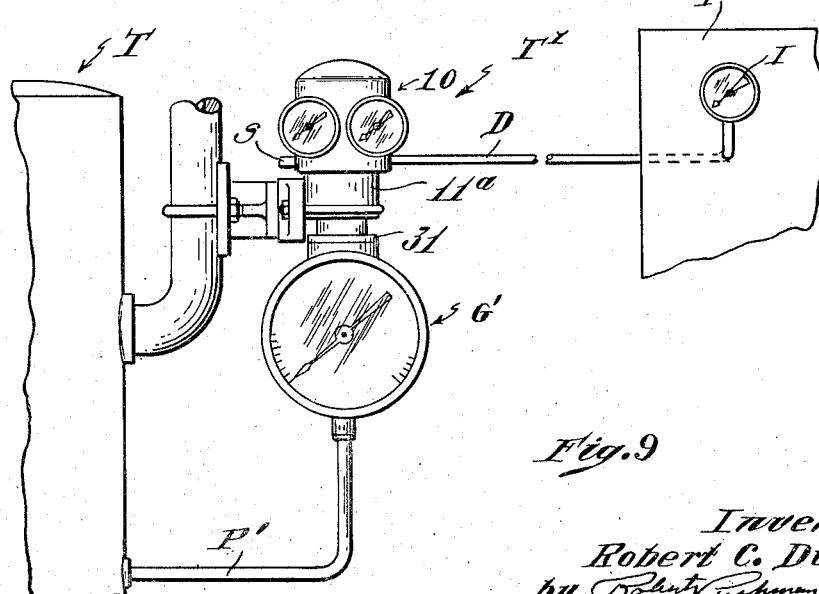
Fig. 9
Inventor
Robert C. Du Bois

Robert C. Du Bois, Fairfield, Conn., assignor to Manning, Maxwell & Moore, Incorporated, Stratford, Conn., a corporation of New Jersey
Filed June 22, 1956, Ser. No. 593,113
4 Claims. (Cl. 137—82)

This invention pertains to low pressure pneumatic transmission systems and more especially to an improved so-called "error detector" for use in such a system. Pneumatic transmission systems of this type are now commonly employed in oil refineries, chemical plants, power plants, etc., or in other situations where it is desirable to be able to observe, record or control conditions, for instance pressure or temperature, at a station remote from the point at which such conditions subsist. By the use of the low pressure transmission system, the high expense incident to the use of high pressure lines and fittings is avoided, and inflammable, poisonous or corrosive liquids or gases or dangerously high pressures or temperatures may be confined to the source and kept at a distance from the observer, recording instrument or control device. Such low pressure transmission systems are of a special advantage where electrical wiring may be objectionable because of fire or explosion hazard and, because of the low pressure employed, light weight tubing of small diameter, and inexpensive fittings may be employed in transmitting the signal from the source to the observing station.

For convenience herein the condition, at the "source," which is to be observed, recorded or controlled will be referred to as "pressure," although it will be understood that other conditions, for example, temperature may be observed, recorded or controlled by the use of apparatus of the same general type and within the scope of the invention.

In such a low pressure transmission system it is usual, although not necessarily the case, that the pressure at the remote point of obervation will be lower than that at the source, the ratio between these pressures being predetermined and the indicating or recording instrument located at the point of observation being so designed as to indicate or record the pressure subsisting at the source, although the indicating or recording instrument itself responds to pressure variations within a much lower range.

The error detector of the present invention responds to the instant departure of the actual pressure ratio, from the predetermined pressure ratio, resultant from variation in the pressure at the source.

In such systems a so-called "transmitter" is usually located at or close to the source (said transmitter comprising or having associated therewith a pressure detector which is sensitively responsive to changes in the actual pressure at the source). The transmitter automatically changes the pressure in the low pressure transmission conduit, which leads to the observing station, in response to changes in pressure at the source. Whenever the pressure at the source varies, the predetermined ratio in pressures is unbalanced for the instant and the function of the error detector of the present invention is automatically to respond to such unbalance and to initiate the restoration of the predetermined pressure ratio so that the indicating or recording instrument will again indicate the pressure subsisting at the source.

The error detector is designed to produce a substantial change in pressure in response to very slight changes in position of an element of the detector, and without imposing an appreciable load upon that element of the pressure detector which responds to changes in pressure at the source. For optimum effectiveness, a device of this type should be so designed that, although the range of motion of its movable parts is normally small, nevertheless it will be capable of a much wider range of motion in response to abnormal conditions, for example, a sudden great increase or decrease in pressure at the source. It is also a requirement that even though the moving part, under such abnormal conditions, moves far from its normal position, nevertheless such abnormal movement shall not cause the transmitter to lose control over the transmitted pressure.

The error detector of the type herein disclosed is useful in the design of a low pressure transmission system of the closed loop type. In such systems it is customary to provide a feed-back in the transmitter system to balance the inlet signal. Such balancing may be accomplished either by the balancing of forces or of motions. The error detector must be very sensitive to change in pressure so as to initiate corrective action as quickly as possible. One common type of error detector used in such systems is the so-called "flapper valve and nozzle." However, this customary type of error detector has certain disadvantages in practice. As usually constructed, the flapper valve is moved bodily toward or from the delivery end of the nozzle by appropriate motion transmitting connections. Since the nozzle is usually a fixed, rigid part, motion of the flapper valve in one direction is limited by its contact with the nozzle. Thus, if, in response to abnormal pressure conditions, the motion transmitting connections tend to continue motion of the flapper valve after it has contacted the nozzle, permanent deformation or even breakage of some of the parts may result.

The flapper valve has a flat face opposed to the nozzle orifice and unless this flat face be accurately normal to the axis of the orifice, an imperfect control of the air flow from the nozzle may result. Moreover, this flat face of the flapper valve should be of such superficial area as to insure proper operation, although the nozzle and flapper valve may be relatively displaced laterally, for instance in response to temperature changes. For this reason and because of other design requirements, the mass of the flapper valve and its actuating connections is usually so large as appreciably to reduce the sensitivity of the device. Moreover, in usual instruments of this type the flapper valve and nozzle are exposed to dust and dirt and also to possible injury.

The present invention has for its principal object the provision of an error detector of the above general type which provides for a more gradual change in pressure than is provided by prior devices intended for this use. A further object is to provide an error detector wherein there is substituted, for the customary flapper valve and nozzle, a ball valve and orifice, which, at one and the same time, provide for great sensitivity and the avoidance of loading the sensitively responsive device excessively, making it possible, in a very simple way, to provide for a possible range of movement of the ball valve in either direction far beyond its normal range of motion. A further object of the invention is to provide apparatus of the above type so designed that although its control element be moved to an abnormal position (in one direction at least), the nozzle pressure, whether high or low, will not be appreciably affected by such abnormal position of the control element. A further object is to provide apparatus of the above type so designed as to provide for free motion of the control element (for example the ball valve) beyond the limits of its normal range of motion in either direction, so as to avoid the imposition of injurious mechanical stress on any of the parts resultant from abnormal pressure conditions. A further object is to provide an instrument of the above type so designed that the entire mass to be moved by the pressure-sensitive means is very small, thereby insuring rapid and sensitive response to variations in pressure. A further object is to provide an instrument of the above type wherein the pressure detector comprises a lever, and the control element receives its motion from said lever, but with the parts so designed that the angular motion of the lever will not cramp the control element, even though the latter be moved beyond the limits of its normal range because of abnormal pressure conditions. A further object is to provide apparatus of the above type so devised as to make possible the use of a control element in the form of a ball, such as an ordinary ball bearing, thereby providing for accuracy of dimensions without requiring expensive machine operation. A further object is to provide apparatus of the above type wherein the control element is a ball normally positioned within a cylindrical passage of a diameter slightly greater than that of the ball, and of a length which does not exceed the diameter of the ball. A further object is to provide an error detector comprising a control element which is arranged to move, with clearance, through a delivery passage with provision whereby said passage is automatically closed completely if, as a result of abnormal conditions, the control element be completely withdrawn in one direction from the passage. A further object is to provide apparatus of the above type wherein the control element and associated parts are enclosed within a rigid housing and thus protected from dirt and dust and from mechanical injury. Other and further objects and advantages of the invention will be pointed out in the following more detailed description and by reference to the accompanying drawings, wherein FIG. 1 is a fragmentary vertical, diametrical section, to greatly enlarged scale, through the valve orifice of an error detector embodying the invention, showing the ball valve in its normal position at approximately the upper limit of its range of motion;

FIG. 2 is a view similar to FIG. 1, but shows the ball valve in an abnormal position such as would occur with a quick decrease in pressure of a small amount below the lower limit of the normal range;

FIG. 3 is a view similar to FIG. 1, but showing the ball valve as having been moved abnormally by a large amount beyond the lower limit of its normal range;

FIG. 4 is a fragmentary, more or less diagrammatic, vertical section showing the error detector of the present invention, embodied in a pneumatic transmitter of a generally conventional type;

FIG. 5 is a view generally similar to FIG. 1, but showing a modified arrangement wherein the auxiliary valve is in the form of a shallow cup instead of the ball illustrated in FIG. 1;

FIG. 6 is a view similar to FIG. 5, but showing the cup inverted, and showing the passage in which the ball is normally positioned as of lesser length than that shown in FIG. 1, thereby making it possible to dispose the actuating stem for the ball valve at an even greater angle, with reference to the axis of the passage, than is possible with the arrangement of FIG. 1;

FIG. 7 is a view generally similar to FIG. 6, but showing a different type of cup and showing a ball valve of approximately hemispherical shape;

FIG. 8 is a fragmentary section similar to FIG. 1, but showing the ball valve associated with a downwardly tapering passage;

FIG. 9 is a diagram illustrating a transmitter system of a kind wherein the device of the present invention may be employed, and FIG. 10 is a graph illustration of the positions of the valve elements as the nozzle pressure varies.

Referring to FIG. 9 of the drawings, which diagrammatically illustrates a transmission system of the general kind above referred to, the character T designates a container wherein pressure or temperature conditions should be kept constant—for instance, wherein a pressure, within a very high pressure range subsists, or wherein, for example, the material being treated is of a poisonous, corrosive, radio-active, or explosive character or the like.

The character T' (FIG. 9) indicates a transmitter which is designed to maintain a predetermined pressure ratio between the pressure in the pipe P' (connected to the container T) and a transmission pipe D. Pipe P' leads to an instrument G', for example a Bourdon tube gauge which desirably, although not necessarily, has a pointer cooperating with a dial graduated to show the actual pressure in the container T. The pipe D is the transmission pipe of the system, leading from the transmitter T' to a remotely located panel F on which is mounted the instrument I, for example, a Bourdon tube gauge, comprising a pointer and dial. The dial of instrument I is desirably graduated to show the same pressure range as the dial of the instrument G', but the Bourdon tube of the instrument I is so designed that, in response to the lower pressure in the transmission pipe D, the indicator of the instrument will show the same pressure as that of the instrument G'.

Referring to FIGS. 1 to 4, the transmitter T' is the device in which the error detector of the present invention is shown as embodied, but it is understood, however, that the device of the present invention is useful in specifically different instruments in substitution for the customary flapper valve and nozzle or equivalent device.

The transmitter T' here shown comprises an air relay 10 (FIG. 4) having a case which includes a base 11 having therein a passage 12 which is supplied by pipe S (FIG. 9) with air from a suitable source and at substantially constant pressure. Assuming, merely by way of example, that the air pressure in the transmission line D is to be within a pressure range of from three to fifteen pounds per square inch, then it is to be recommended that the pressure in pipe S and passage 12 be from eighteen to twenty pounds per square inch.

The casing of the transmitter includes a part 11ª mounted on the base 11. The passage 12 in the base is extended upwardly to a chamber 12ª and thence further up to a restriction orifice R where the pressure is reduced, the air then flowing through the passage 13 into a chamber 14 between the left-hand wall of the casing and a large diaphragm 15. From this latter chamber a passage 14ª extends downwardly through the base 11 and is connected by means of a flexible conduit 17 with a chamber 16 in a vertically movable nozzle-housing 18 arranged in a part 11ᵇ of the casing disposed beneath the base 11.

Within the upper part 11ª of the casing there is a second diaphragm 15ª spaced from the diaphragm 15 to provide between them a chamber 19 having an exhaust port 20 in its wall through which pressure fluid may exhaust to the atmosphere. The diaphragm 15ª is spaced from the right-hand wall of the casing to provide a chamber 21, which at times communicates with the chamber 12ª by means of a port which is controlled by a valve 22. A part 23 connects the diaphragms 15 and 15ª so that they are compelled to move in unison, this part 23 having a seat with which the valve member 22 at times engages, the part 23 having a port 24 which leads into the space 19 between the diaphragms.

A passage 25 in the base 11 communicates, at one end, with the chamber 21 in the upper part 11ª of the casing, this passage 25 being connected by the conduit D to the remotely located indicator, recorder, or controller I. At its inner end the passage 25 also communicates, by means of a port 26, with the interior of the feed-back bellows 27 located in the lower part 11ᵇ of the casing and having a movable lower head 28 which is fixed to the vertically movable housing 18. The upper head of the feed-back bellows is fixed to the base 11. A spring 29, acting in opposition to the bellows, tends to raise the housing 18, while expansion of the bellows tends to move the housing 18 downwardly.

The lower part 11ᵇ of the casing has a flange 31 (FIGS. 4 and 9) to which there is secured the casing of the pressure detecting instrument G' here shown for example, as a Bourdon tube gauge. The Bourdon tube, by means of a link 33 (FIG. 4) rocks a segment lever 34 which, by means of a pinion, turns an index staff 35 and at the same time rocks a lever arm 36 to which is secured a rod 40 which extends upwardly through a central aperture in flange 31 and into the lower part of nozzle-housing 18. Increase in pressure causes the arm 36 to move clockwise, thus lowering the rod 40.

The housing 18 (FIG. 1) is provided with a cylindrical delivery passage 37 (FIG. 1) connecting a nozzle-chamber 16ᵃ (FIGS. 1 and 4) in housing 18 with a delivery chamber 38. The pressure in nozzle-chamber 16ᵃ is the "nozzle pressure" which is controlled by the valve device of the present invention. Preferably, this chamber 38, which is open at its lower end, is of generally conical form, having upwardly converging side walls, and is open to the atmosphere at its lower end. To the upper end of the rod 40 there is secured a ball valve 39 of a diameter slightly less than the diameter of the delivery passage 37 so that under certain conditions the ball valve can pass entirely through the passage from the chamber 16ᵃ to the chamber 38. The space (usually annular) between the peripheral surface of the ball and the nearest portion of the wall of passage 37 constitutes the discharge orifice from nozzle-chamber 16ᵃ. The difference between the radius of the ball and the radius of passage 37 is the radial width of this annular orifice when the latter is of minimum capacity.

Under normal conditions the ball 39 will be in some such position as that illustrated in FIG. 1 where it partially closes the passage 37. Obviously, if the ball be lifted to a position higher than that shown in FIG. 1, the effective size of the discharge orifice will be increased. Because of its spherical shape, upward motion of the ball from the position of FIG. 1 results in a gradual and smoothly progressive increase in the effective size of the nozzle orifice and thus in a gradual lowering of the pressure in chamber 16ᵃ. That position of the ball 39 wherein its horizontal diameter is in the plane of the surface E constitutes the lower limit of its normal range of motion. As the ball moves down below said lower limit of its normal range, to the position shown in FIG. 2, the effective size of the port remains unchanged and at a minimum until the horizontal diameter of the ball passes below the plane of the lower end of said passage 37. Since the valve 39 is spherical, it becomes possible to employ a common ball bearing as the valve. Such commercially obtainable bearing balls are manufactured to very close dimensional tolerances and by using such a ball as the valve, great accuracy at small expense is obtainable.

The following cited dimensions are useful when dealing with output air pressures within the following ranges, that is to say, from 3 to 15 p.s.i.; from 3 to 18 p.s.i.; from 5 to 25 p.s.i.; and from 3 to 27 p.s.i.:

Ball 39 may be of a diameter of from 0.0625, + or − 0.0001";
Passage 37 may be of a diameter of 0.0628, + or − 0.0001";
Passage 37 may be of a length of 0.057".

The minimum length of the passage 37 must in any case be sufficient to permit the auxiliary valve 41 (hereafter described) to seat and close the passage before the valve ball 39 has moved down completely out of the passage.

With the above suggested dimensions the total weight of the ball and its actuating rod 40 would not necessarily exceed 2.4 grams, so that the entire mass to be moved by the pressure-sensitive element (Bourdon tube of instrument G') is so small as to insure sensitive and rapid response of the error detector.

It is contemplated that under certain abnormal conditions the ball valve 39 might move down so as to be located as shown in FIG. 3. In order, under such circumstances, to prevent the free escape of air from the chamber 16ᵃ there is desirably provided an auxiliary valve 41. As shown in FIGS. 1 to 4, this auxiliary valve is a ball of larger diameter than the ball 39 and which, by gravity, or if desired assisted by means of a spring 42, will seat so as completely to close the passage 39, in the event that the ball valve is withdrawn low enough so that the ball 41 can be seated.

By making the chamber 38 of conical shape the ball is guided back into passage 37 when the rod 40 again rises. Moreover, the rod 40 may permissibly take various positions of inclination to the vertical so that arcuate movement of its lower end, where it is connected to lever arm 36, or failure of the rod 40 to align exactly with the axis of the passage 37 for any other reason will not interfere with the function of the ball 39.

A slight modification is illustrated in FIG. 5, wherein, with the exception of the auxiliary valve, all the parts are like those illustrated in FIG. 1 and are similarly numbered. In this arrangement, the auxiliary valve 41ᵃ is a shallow cup instead of a ball, this cup having a flat under surface which normally contacts the ball valve 39. The diameter of this cup 41ᵃ is such as to provide clearance between it and the wall of the nozzle-pressure chamber 16ᵃ and its upstanding flange or wall is of a depth such as to prevent it from tipping sufficiently to bind in moving up and down in the chamber 16ᵃ. This arrangement lessens the tendency of the auxiliary valve, either by reason of its own weight or by the downward pressure of the spring 42, to exert a lateral component of stress on the valve ball 39 such as may result from the employment of the large ball 41.

In FIG. 6 a further modification is illustrated wherein, as in FIG. 5, the parts are similar to those shown in FIG. 1 and similarly numbered, except for the auxiliary valve which in this instance is numbered 41ᵇ. This auxiliary valve 41ᵇ has the very shallow upstanding flange 50 which serves to locate the lower end of the spring 42, and has the deep downwardly directed flange or wall 51 which partially embraces the ball valve 39, and whose lower edge is designed to seat against the horizontal surface E at the lower end of the chamber 16ᵃ. With this arrangement it is possible to make the passage 37ᵃ much shorter than the normal passage 37, as shown in FIG. 1, because, with this arrangement, even though the passage 37 be short, the auxiliary valve will close before the horizontal diameter of the ball 39 has moved down below the plane of the lower end of the passage. This shorter passage 37ᵃ has the advantage that it permits the rod 40 to be swung to a greater angle to the vertical than is possible with the arrangement of FIG. 1.

A further modification is illustrated in FIG. 7. In this arrangement the parts are generally similar to those shown in FIG. 5 except that the spherical ball 39 of FIG. 5 is replaced by a ball whose upper portion has been removed, so that this valve 39ᵃ is but slightly more than a hemisphere in extent, having a flat upper surface on which the disk-like auxiliary valve 41ᶜ rests. With this arrangement it is possible, as in the device of FIG. 6, to use a passage 37ᵃ which is much shorter than the passage 37 of FIG. 1, because, in this arrangement, as in that of FIG. 6, the auxiliary valve 41ᶜ will contact the seat surface or chamber floor E and close the passage 37ᵃ before the rod 40 is moved downwardly as much as is necessary in the arrangement of FIG. 1 to clear the ball valve from the passage. The shortened passage 37ᵃ of FIG. 7 has the same advantage as that of the arrangement of FIG. 6.

In FIG. 8 a still further possible modification is illustrated, wherein corresponding parts are numbered similarly to those in FIG. 1, but in this arrangement the passage 37ᶻ, with which the ball valve 39 cooperates, tapers downwardly. Thus this arrangement also provides for the gradual variation in the effective area of the port, but the formation of the conical passage is more difficult, where great accuracy is required, than is the simple cylindrical passage of FIG. 1.

The motions of the valve elements 39 and 41 and corresponding variations in nozzle pressure are diagrammatically illustrated in FIG. 10. In this view ordinates represent nozzle pressures in p.s.i. and abscissae represent the positions of the valve elements 39 and 41 with reference to the plane of the seat surface or floor E of the chamber 16ª. The working or normal nozzle pressure range is indicated to be from 2 to 5 p.s.i. and the corresponding range of motion of the valve ball 39 is indicated as of the order of 0.002."

The lowermost horizontal portion K of the graph represents the condition wherein both valve elements 39 and 41 are within the chamber 16ª and the valve element 39 is so far above the seat surface E that it does not restrict flow through the passage 37. This indicates an unusual condition in which the nozzle pressure is abnormally low.

The central portion K¹ of the curved part of the graph represents the condition when the pressure is within the normal range and the valve element 39 occupies a position such as exemplified in FIG. 1. For this pressure range this valve element 39 moves up and down within the above suggested range of motion thus varying the effective size of the orifice through which fluid from the chamber 16ª may escape into the passage 37.

The part K² of the graph represents an unusual condition in which the pressure in tank T is such that the ball 39 is located wholly within passage 37. This portion of the graph is horizontal because the clearance between the valve and the wall of the passage 37 is constant under these conditions.

The horizontal portion K³ of the graph indicates that abnormal condition wherein the pressure in the tank T is so high that the main valve 39 has moved down, for example as illustrated in FIG. 3, until the auxiliary valve 41 has seated, thus entirely closing the entrance to the passage 37 and maintaining maximum pressure in chamber 16ª.

While the operation of the device should be obvious to those skilled in the art, it may be outlined briefly as follows. Let it be assumed, that conditions are such that the valve 22 (FIG. 4) is closed and the valve 39 is positioned substantially as shown in FIG. 1. Supply air from a suitable source and at substantially constant pressure enters the apparatus through the pipe S and this pressure is maintained within the chamber 12ª. Air from this chamber flows through the reducing orifice at R and the air at reduced pressure flows through the passage 13 into the space 14 and thence through the passage 14ª to the space within the movable nozzle device 18 and thence into the nozzle chamber 16ª. From this chamber, the air escapes through the delivery passage 37 and out around valve 39 and through the discharge chamber 38, the rate of such discharge being determined by the position of the valve 39. The position of valve 39 depends upon the pressure at the pressure-responsive device G'. If now the pressure in the processing apparatus T increases, the arm 36 of the pressure-responsive device G' will turn clockwise to an extent dependent on the increase in pressure. The valve stem or rod 40 thus moves downwardly, permitting the valve 39, by gravity action, assisted by the weight of the auxiliary valve, and the spring 42 if the latter be employed, so as to decrease the area of the escape orifice leading from chamber 16ª is now somewhat restricted, the pressure in the spaces 14, 14ª and so forth will increase, thus causing the large diaphragm 15 to move a corresponding amount to the right; and, thus, by means of the part 23, the valve 22 is moved away from its seat. This permits pressure fluid from the chamber 12ª to enter the space 21 and thence to flow through the passage 26 into the feed-back bellows 27. This bellows is thus expanded and so moves the nozzle device 18 downwardly, thus to a certain extent neutralizing the effect of the downward or closing motion of the valve 39 so that the pressure in the space 14 to the left of the large diaphragm 15 decreases, thus permitting the valve 22 again to approach its seat with the result that equilibrium is reached with a higher air pressure transmitted through the pipe D to the pressure-responsive device G' and the indicator I.

If now the pressure in the processing apparatus T should decrease, the arm 36 of the pressure-responsive device G' will rotate upwardly, thus raising the valve stem or rod 40 and moving the valve 39 upwardly with reference to the nozzle device 18. Pressure fluid now escapes more rapidly from the chamber 16ª and the pressure in the chamber 14 drops, permitting the spring to move the valve 22, to move the diaphragms 15 and 15ª to the left, as viewed in FIG. 4, allowing air to escape from chamber 21 through the port 24 into the chamber 19 and thence through the discharge port 20, the valve 22, at this time, being closed. The decreased pressure in the space 21 permits the spring 29 to compress the bellows 27, thus moving the nozzle device 18 upwardly and so decreasing the escape orifice between the valve 39 and the nozzle device. Air now begins to build up in the space 14 and eventually moves the diaphragm 14 to the right, thus decreasing or stopping the flow of air through the port 24 and reducing the escape of air from the bellows 27 until equilibrium is established with a lower pressure at the indicator I.

While the apparatus is operating within the normal pressure range for which it is designed, the valve 39 will move up and down with its major portion, at least, within the chamber 16ª and with its major horizontal diameter above the plane of the surface E. Such motion will vary the effective area of the annular escape orifice defined by the peripheral surface of the valve 39 and the upper edge of the delivery passage 37.

However, if through some fortuitous circumstance, the relative motion of the nozzle device 18 and the valve 39 should become abnormal, such for instance as the occurrence of extremely low pressure at the pressure-responsive device G', the valve 39 is free to move upwardly into the chamber 16ª without obstruction except for the slight opposition from the very light spring 42, if the latter be used, and the delivery passage 37 will be kept wide open. On the other hand, if the pressure at the processing device T increases beyond the normal range, then the valve 39 is free to move downwardly through the passage 37 without obstruction until it entirely escapes from said passage as shown in FIG. 3; but, since, under such circumstances, the passage 37 should be closed, the auxiliary valve is provided which automatically closes the delivery passage 37 as soon as the valve 41 reaches a predetermined position in its downward motion. Thus, as contrasted with the usual "flapper" valve employed in apparatus of this type, the valve device of the present invention is free to move beyond its normal limit of motion in either direction without danger that parts will be broken or permanently deformed by the application of unintended forces. Moreover, throughout the normal range of relative motion of the valve 39 and the nozzle device 18, the force required to move them remains substantially constant. Since the valve 39 is not intended to make closing contact with any other part, there is no necessity for such extreme accuracy in workmanship or care in assembly of the parts as is requisite in controlling valves such as are commonly provided.

While various shapes and combinations of ball valve, delivery passage, and auxiliary valve have herein been illustrated and described by way of example, and while certain dimensions have been suggested as useful, it is to be understood that the arrangements illustrated and described and the dimensions suggested are merely by way of example and that all equivalent arrangements, shapes of parts and dimensional relationships, whereby the stated objects of the invention are obtainable, and such as fall

I claim:

1. In combination in a pressure transmitting system which includes a nozzle device having therein a chamber to which pressure fluid is supplied, a delivery passage leading outwardly from said chamber, valve means for controlling the escape of pressure fluid from the chamber through said passage, the valve means comprising a main valve and an auxiliary valve, a pressure-responsive device, and motion-transmitting means between the pressure-responsive device and the main valve, the main valve being of a size such that it may move freely, with clearance, along the delivery passage, both of said valves being normally within said chamber, the main valve having a spherical surface so disposed that so long as the pressure to which the pressure responsive device is exposed is within a predetermined range, the effective size of the delivery passage progressively varies as the maximum transverse dimension of the main valve moves toward or from the entrance to the delivery passage, the motion-transmitting connections being operative to move the main valve to a position such as to permit free, unrestricted escape of pressure fluid through the delivery passage, if the fluid pressure, which acts upon the pressure responsive device, drop below the lower limit of said range.

2. The combination according to claim 1, wherein the auxiliary valve is a sphere of a radius larger than that of the delivery passage, the motion-transmitting connections being so constructed and arranged that in response to a rise in fluid pressure at the pressure-responsive device to a predetermined amount above the upper limit of said range, the entire main valve is moved beyond the discharge end of the delivery passage, and the auxiliary valve is freed to move to a position such as completely to close the delivery passage.

3. In combination in a pressure transmitting system which includes a nozzle device having therein a chamber to which pressure fluid is supplied, a cylindrical delivery passage leading outwardly from said chamber, valve means for controlling the escape of pressure fluid from the chamber through said passage, said valve means comprising a spherical main valve and a spherical auxiliary valve, and a pressure-responsive device and motion transmitting connections between the pressure-responsive device and the main valve, the main valve and the nozzle device being operative, so long as the pressure at the pressure-responsive device remains within a predetermined range, correspondingly to vary the rate of escape of pressure fluid through the delivery passage, the motion-transmitting connections being so constructed and arranged that the main valve is free to be moved by the pressure-responsive device in response to abnormally high pressure beyond the discharge end of the delivery passage where it no longer controls the flow of fluid through the delivery passage, and the auxiliary valve being operative completely to close the passage when the main valve has been so inoperatively positioned.

4. In combination in a pressure transmitting system, a nozzle device having therein a nozzle chamber and a cylindrical delivery passage leading outwardly from the chamber, a valve which is normally positioned adjacent to the entrance to said passage for controlling the rate of escape of pressure fluid from said chamber through said passage, a pressure-responsive device for moving the valve, the valve being a sphere of a radius less than that of the passage by an amount such as to provide a predetermined clearance between the valve and the wall of the passage, the main valve being a spherical ball affixed to one end of a rigid stem, motion-transmitting means between the opposite end of the stem and the pressure-responsive device, the pressure-responsive device being operative, in response to abnormally high pressure, to move the main valve through the delivery passage and beyond the discharge end of the latter, the passage merging at its discharge end with the smaller end of a frusto-conical chamber whose wall constitutes guide means operative to guide the main valve back into the delivery passage as the pressure-responsive device responds to the return of the pressure toward normal.

References Cited in the file of this patent

UNITED STATES PATENTS

| | | |
|---|---|---|
| 318,083 | Brennan | May 19, 1885 |
| 376,129 | Anderson | Jan. 10, 1888 |
| 1,071,271 | Spangler | Aug. 26, 1913 |
| 1,558,064 | Thrift | Oct. 20, 1925 |
| 1,669,650 | Block | May 15, 1928 |
| 1,720,389 | Binks | July 9, 1929 |
| 1,866,858 | Lombard | July 12, 1932 |
| 1,946,882 | Russell | Feb. 13, 1934 |
| 2,047,581 | Grissett | July 14, 1936 |
| 2,256,963 | Schmidt | Sept. 23, 1941 |
| 2,283,296 | Temple | May 19, 1942 |
| 2,339,469 | Emanuel | Jan. 18, 1944 |
| 2,380,507 | Eaton | July 31, 1945 |
| 2,556,436 | Moore | June 12, 1951 |
| 2,597,032 | Ray | May 20, 1952 |
| 2,645,240 | Drake | July 14, 1953 |
| 2,736,337 | Parks et al. | Feb. 28, 1956 |
| 2,736,629 | Smith | Feb. 28, 1956 |
| 2,771,897 | Bailey | Nov. 27, 1956 |
| 2,778,371 | Dannevig | Jan. 22, 1957 |

FOREIGN PATENTS

| | | |
|---|---|---|
| 899,286 | Germany | July 8, 1949 |
| 475,178 | Canada | July 10, 1951 |